United States Patent [19]

Narayanaswami

[11] Patent Number: 5,485,562
[45] Date of Patent: Jan. 16, 1996

[54] SYSTEM AND METHOD FOR CLIPPING PIXELS DRAWN IN ONE OF PLURALITY OF WINDOWS IN A COMPUTER GRAPHICS SYSTEM

[75] Inventor: Chandrasekhar Narayanaswami, Austin, Tex.

[73] Assignee: International Business Machines Corporation, Armonk, N.Y.

[21] Appl. No.: 121,139

[22] Filed: Sep. 14, 1993

[51] Int. Cl.$^6$ .................................................. G06T 15/30
[52] U.S. Cl. ........................... 395/134; 395/133; 395/157
[58] Field of Search .................................... 395/134, 157, 395/133, 155, 158, 160, 161, 162–166

[56] References Cited

U.S. PATENT DOCUMENTS 5,091,720  2/1992  Wood ................................. 395/157 X
5,157,764  10/1992  Priem et al. ........................... 395/157
5,231,695  7/1993  Harrington ............................ 395/134

*Primary Examiner*—Almis R. Jankus
*Attorney, Agent, or Firm*—Mark S. Walker

[57] ABSTRACT

A system and method for performing efficient clipping to visible windows. A window clip buffer is established for each window being written directly to the front frame buffer. The window clip buffer is initialized as having the same dimensions as the window itself and each pixel position is initially set to False (not visible.) The visible regions are determined and the buffer updated to True (visible) for those visible regions. As each pixel is being drawn the window clip buffer is tested. The pixel is drawn to the frame buffer only where the window clip buffer pixel is true (visible.) Changes to window positions on the screen causes the visible regions to be updated.

6 Claims, 2 Drawing Sheets

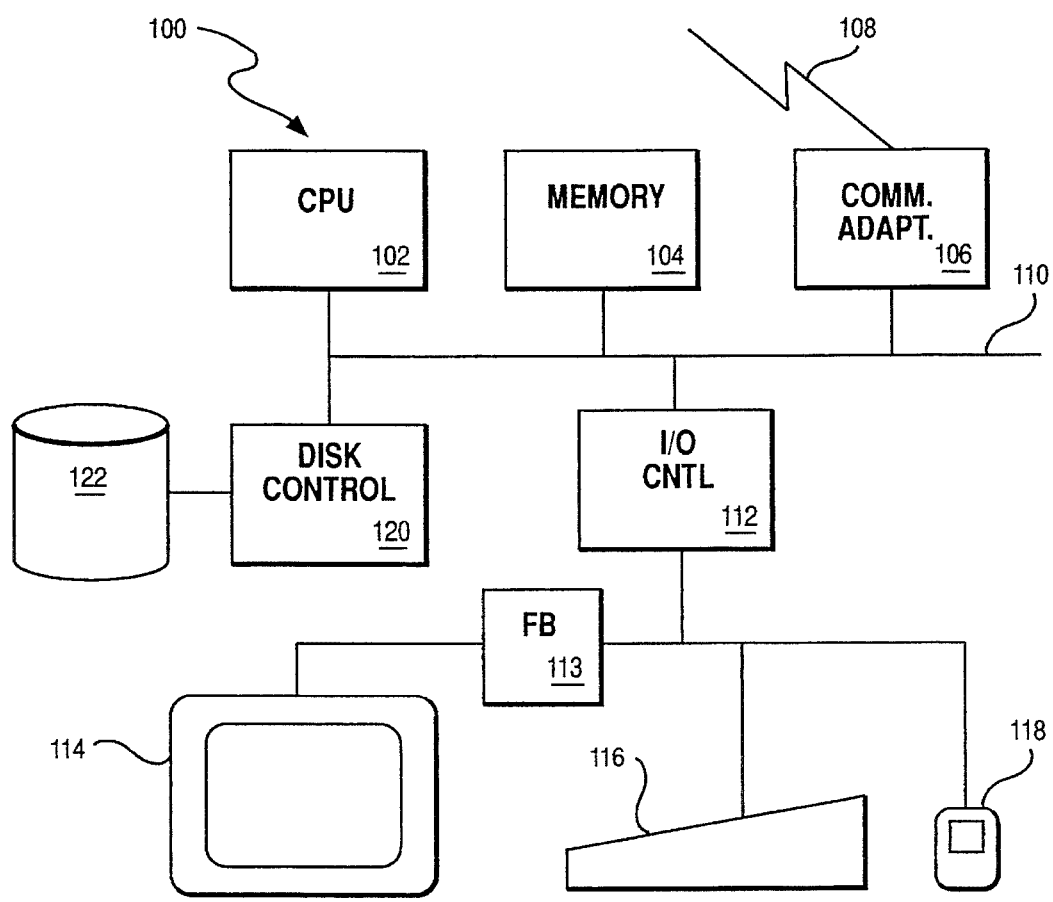
FIG. 1
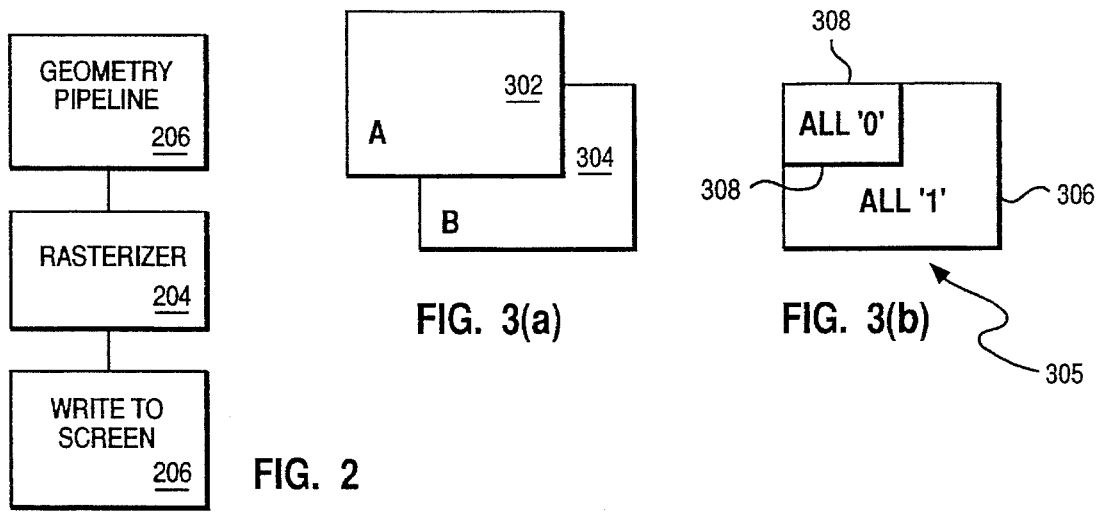
FIG. 2
FIG. 3(a)
FIG. 3(b)

SYSTEM AND METHOD FOR CLIPPING PIXELS DRAWN IN ONE OF PLURALITY OF WINDOWS IN A COMPUTER GRAPHICS SYSTEM

BACKGROUND OF THE INVENTION

1. Field of the Invention

The present invention relates to graphics systems and more particularly to apparatus and methods for increasing the speed at which graphic images can be clipped and drawn to a display window. Still more particularly, the present invention relates to a system and method for increasing the processing speed of clipping where the resultant image is written directly to the display frame buffer.

2. Background and Related Art

Windowed graphic systems display a number of overlapping windows on a physical display device such as a CRT screen. Each window is updated by one or more applications. Each application writes text or graphic images to its assigned window or windows. Because the windows overlap, portions of a window may not be visible. Writing text or image data to an invisible window portion is wasteful of processing capacity.

Prior art graphic systems implement a clipping buffer to control writing of data to the visible portions of the frame buffer. The clipping buffer is defined to contain the same number of horizontal and vertical positions as the display screen, e.g. 1024×1278. Each clipping buffer position contains a value indicating which, if any, window is visible at that point. The clipping buffer value is tested by each particular window and only those matching the clipping buffer value write to the frame buffer. Window clipping is typically performed by hardware in the graphics pipeline in hardware graphics adapters.

The increased processing capacity of technical workstations, particularly those based on RISC architecture designs, allow high function graphics processing to be performed without special purpose graphics hardware. The system processor can be used to perform graphics functions including transformation, scaling, and rendering. Use of the system processor rather than special purpose graphics hardware poses a problem for window clipping.

Double buffered graphics systems maintain two frame buffer images: one for current display (the front buffer); and one being updated by the applications (the back buffer). The back buffer is periodically copied to the front buffer thereby updating the display. Windowed systems are frequently implemented with a back buffer for each window that is clipped to the visible portion during the copy to the front buffer. The copy is performed as a block transfer operation and clipping can be efficiently performed using block mode operations.

Existing system processor based graphics functions (typically two dimensional graphics) typically write directly to the frame buffer and do not use double buffering. Clipping must be performed for each pixel as it is generated when the pixels are written directly to the frame buffer. This can result in inefficient and poor performance of the graphics system.

A process for efficiently performing window clipping when rendering directly to the front buffer is needed. The technical problem addressed by this invention is the provision of a system and method for efficiently performing window clipping in this situation.

SUMMARY OF THE INVENTION

The present invention is directed to providing a system and method for efficiently clipping windows while writing directly to the front frame buffer. The present invention provides a clipping buffer for each window that represents the visible and invisible window regions as binary values. Clipping using the window clipping buffer can be efficiently performed using masking techniques.

The present invention is directed to a method for clipping pixels being drawn into one of a plurality of windows in a computer graphics system having a memory and a processor. The method comprises the steps of: allocating a portion of the memory to be a window clip buffer; testing the others of the plurality of windows to determine a plurality of obscured regions where the other windows obscure the one window; transforming the window clip buffer to indicate visibility or obstruction at each pixel position; for each pixel drawn to the one window performing the following steps: testing a value in the window clip buffer corresponding to the pixel position of the pixel being drawn; drawing the pixel if the test indicates a visible location, and bypassing drawing if the location is not visible.

It is therefore an object of the present invention to provide a system allowing efficient clipping of windows written directly to the front frame buffer.

It is yet another object of the invention to provide a process for managing a clipping window for each system window.

It is still another object of the invention to provide a process for rendering to the front frame buffer without incurring a window clipping penalty.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIG. 1 is a block diagram of a computer system on which the preferred embodiment of the present invention is implemented.

FIG. 2 is a block diagram illustrating the processes performed by a graphics system according to the present invention.

FIGS. 3(a) and 3(b) depict a set of windows and the associated window clip buffer according to the present invention.

DETAILED DESCRIPTION

Figure 4:
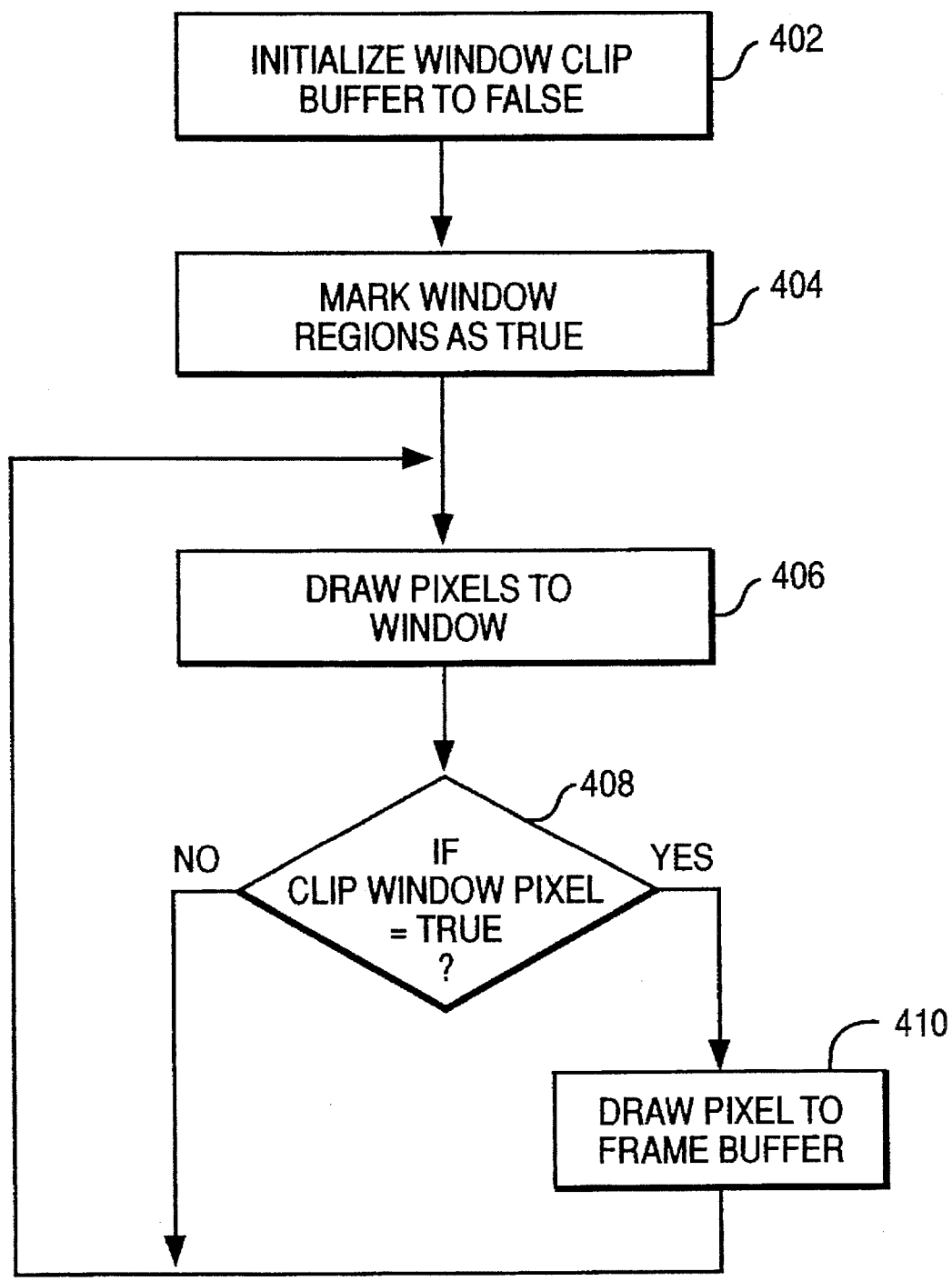
FIG. 4 is a flowchart depicting the inventive process steps of the present invention.

The present invention is implemented in a computer system such as that shown in FIG. 1. The computer system is preferably an IBM RISC System/6000 computer from the IBM Corp. (IBM and RISC System/6000 are trademarks of the IBM Corp.) though any similar workstation, personal computer or mainframe computer could be employed.

The computer system 100 has a processing unit 102, random access memory 104 and permanent storage 122. In addition, an optional communications adapter 106 enables communication with other computer systems. Input/Output controller 112 controls interaction with the video display 114, the keyboard 116 and pointing device 118. A frame buffer or graphics memory 113 is provided in high function graphics systems to store the pixel data for display on the display device 114. Disk controller 120 controls interaction between the processing unit and the permanent storage 122. The options represented here are typical components used in the preferred embodiment. Other components with similar function could replace those shown, for example, a removable diskette or an optical drive could be used in place of a magnetic drive for permanent storage 122 and the processor 102 could be comprised of a number of processing engines in a multiprocessor or parallel processing architecture.

Graphics processing in the preferred embodiment occurs as a series of functional steps. FIG. 2 illustrates the pertinent steps. The Geometry Pipeline 202 performs transformation of coordinates for a graphics image, culling of hidden objects, clipping to the view volume, lighting calculations and assembly of the primitives for rendering. Rasterization subsystem 204 accepts the primitives and generates pixels to the frame buffer as required by each primitive. The generated pixels are written to the screen 206.

The problem of overlapping windows is shown in FIG. 3(a). Window A 302 overlaps window B 304 obscuring part of window B. An application writing to window B must detect the overlap and write only to the visible area.

The present invention implements a clipping window 305 as shown in FIG. 3(b). Clipping window 305 has the same dimensions as window B. The visible portion of window B contains a binary 1 in all pixel positions 306 while the obscured portion contains binary 0s 308. The use of reversed binary values (0=visible and 1=obscured) or non-binary values is also possible in alternate embodiments. The clipping window for each window is maintained in system memory 104 for ready update and access.

The process steps for the current invention are illustrated in FIG. 4. The Window Manager (not shown) of the graphics system is notified of any changes to the location, size or existence of all windows on the display. The window clip buffer is initialized to FALSE (obscured) whenever a new window is defined 402. The Window Manager analyzes the regions of the display to determine which are visible whenever a window is moved, created or deleted. The pixels within each of the window's visible regions are next marked as true (visible) creating the final clip mask 404. Any action that changes the positions of the windows will cause the window clip buffer to be updated.

The application continues after defining a window and draws pixels to the window 406. As each pixel is drawn the window clip buffer value for that position is tested 408 and the pixel drawn 410 only if the buffer value is TRUE (visible). The binary test can be quickly and efficiently performed providing rapid clipping of the window data. One feature that further improves performance is that only those pixels being rendered get clipped. A window background pixel that is not changed is not clipped, further improving the efficiency of the present invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A method for clipping pixels being drawn into one of a plurality of windows in a computer graphics system, the system having a memory and a processor, the method comprising the steps of:

allocating a portion of said memory to be a window clip buffer;

testing the others of said plurality of windows to determine one or more regions where said other windows obscure said one window;

transforming said window clip buffer to indicate visibility or obstruction at each pixel position;

for each pixel drawn to said one window performing the following steps:

testing a value in said window clip buffer corresponding to the pixel position of the pixel being drawn;

drawing said pixel if said test indicates a visible location, and bypassing drawing if the location is not visible.

2. A system for clipping graphic images in a graphics system having a processor, display device and memory, wherein the graphic images are written to a frame buffer in said memory and displayed in one of a plurality of windows on the display device, the system comprising:

means for allocating a window clipping buffer from said memory;

means for initializing said window clipping buffer to a first value;

means for determining regions of said one window that are obscured by others of said plurality of windows;

means for writing a second value to said window clipping buffer only in areas of said window clipping buffer corresponding to one or more portions of said one window that are visible;

means for testing said window clipping buffer before writing graphic image data to said frame buffer and writing said graphic image data only if said buffer indicates a visible region.

3. The system of claim 2, wherein a separate window clipping buffer is allocated for each of said plurality of windows.

4. The system of claim 2, wherein said means for determining visible regions and said means for writing a second value operate whenever a window is created on said display device.

5. The system of claim 2, wherein said means for determining visible regions and said means for writing a second value operate whenever a window on said display device is deleted.

6. The system of claim 2, wherein said means for determining visible regions and said means for writing a second value operate whenever a window on said display device is modified.

* * * * *